Aug. 19, 1969 D. H. HOLLANDS 3,462,736

DATA COMMUNICATION SYSTEM

Filed Nov. 26, 1965 3 Sheets-Sheet 1

INVENTOR.
DANIEL H. HOLLANDS

BY [signature]
ATTORNEY

Aug. 19, 1969 D. H. HOLLANDS 3,462,736

DATA COMMUNICATION SYSTEM

Filed Nov. 26, 1965 3 Sheets-Sheet 2

INVENTOR.
DANIEL H. HOLLANDS

BY [signature]
ATTORNEY

Aug. 19, 1969 D. H. HOLLANDS 3,462,736

DATA COMMUNICATION SYSTEM

Filed Nov. 26, 1965 3 Sheets-Sheet 3

INVENTOR.
DANIEL H. HOLLANDS

BY [signature]
ATTORNEY

United States Patent Office
3,462,736
Patented Aug. 19, 1969

3,462,736
DATA COMMUNICATION SYSTEM
Daniel H. Hollands, Webster, N.Y., assignor to General Dynamics Corporation, a corporation of Delaware
Filed Nov. 26, 1965, Ser. No. 510,023
Int. Cl. G08b 29/00
U.S. Cl. 340—146.1 13 Claims

ABSTRACT OF THE DISCLOSURE

A system for transmitting information regarding the condition of a large number of binary elements such as single-pole-double-throw switches is described. The system is efficient in that it transmits a message corresponding to the condition of the switch only when its condition changes (viz the switch pole moves from on to off or from off to on). A counter of the recirculating type interrogates a message code generator which is associated with each switch. The interrogation of each switch occupies two time slots; one corresponding to the on and the other to the off condition of the switch. The message code generator also has a flip-flop. The flip-flop is either set or reset depending upon the condition of the switch during a previous interrogation. Upon each interrogation, if the position of the switch changes, the message code generator associated with that switch produces an output which stops the counter. The code stored in the counter is then read out into the line as a digital message which represents the changed state of the switch and identifies the switch which changes state.

The present invention relates to a system for communicating digital data, and particularly to a data communication system for transmitting data respecting the condition of binary elements.

The invention is especially suitable for use in a system for transmitting messages respecting the conditions of a large number of binary elements. By a binary element is meant any element that has two different states, such as an "on" state and an "off" state. Included within the class of binary elements are switches, flip-flops and many other devices which may perform binary operations. An individual message contains information identifying the binary element which changed state, as well as the state which said binary element has assumed. A system may be used for purposes of telemetering information between remote points or for the remote control of industrial processes or data processing equipment.

Digital information transmission is desirably accomplished very rapidly. Rapid data transmission of messages which contain a large number of digits is generally accomplished at the expense of increased complexity, as well as increased cost. For example, systems have been proposed with individual message registers for each message, which must be addressed and read out into a line. The addressing logic and large number of registers which is required renders such systems complex and costly.

It is an object of the present invention to provide an improved system for communicating digital data which is adapted to handle digital messages having a large number of bits.

It is a still further object of the present invention to provide an improved high speed data transmission system for transmitting messages having a large number of bits, which is less complex and lower in cost than prior systems.

Briefly described, a system for transmitting digital information in accordance with the present invention includes a code generator such as a counter which is capable of generating a plurality of different digital codes in successive time periods. Different pairs of such codes may correspond to the states of different ones of a large number of binary elements. The system also includes a plurality of message code generators, each corresponding to a different one of the binary elements. These message code generators have memory for the state of the binary element corresponding thereto. The message code generator is enabled by the one of the codes for its corresponding binary element. The information stored in the memory of the message code generator is compared, in the time period of its enabling digital code, with information as to the existing state of the binary element. If the state of the element changes, a signal is generated which tags the digital code. This tag signal is operative to read a message corresponding to the digital code out onto a line over which the message may be transmitted. Accordingly, a message is rapidly transmitted, whenever a binary element changes state. In a typical application for remote control, the binary elements may represent different steps in a process which are initiated at the remote point by changing the state of the binary element.

The invention itself, both as to its organization and method of operation, as well as additional objects and advantages thereof will become more readily apparent from a reading of the following description in connection with the accompanying drawings in which.

Figure 1:
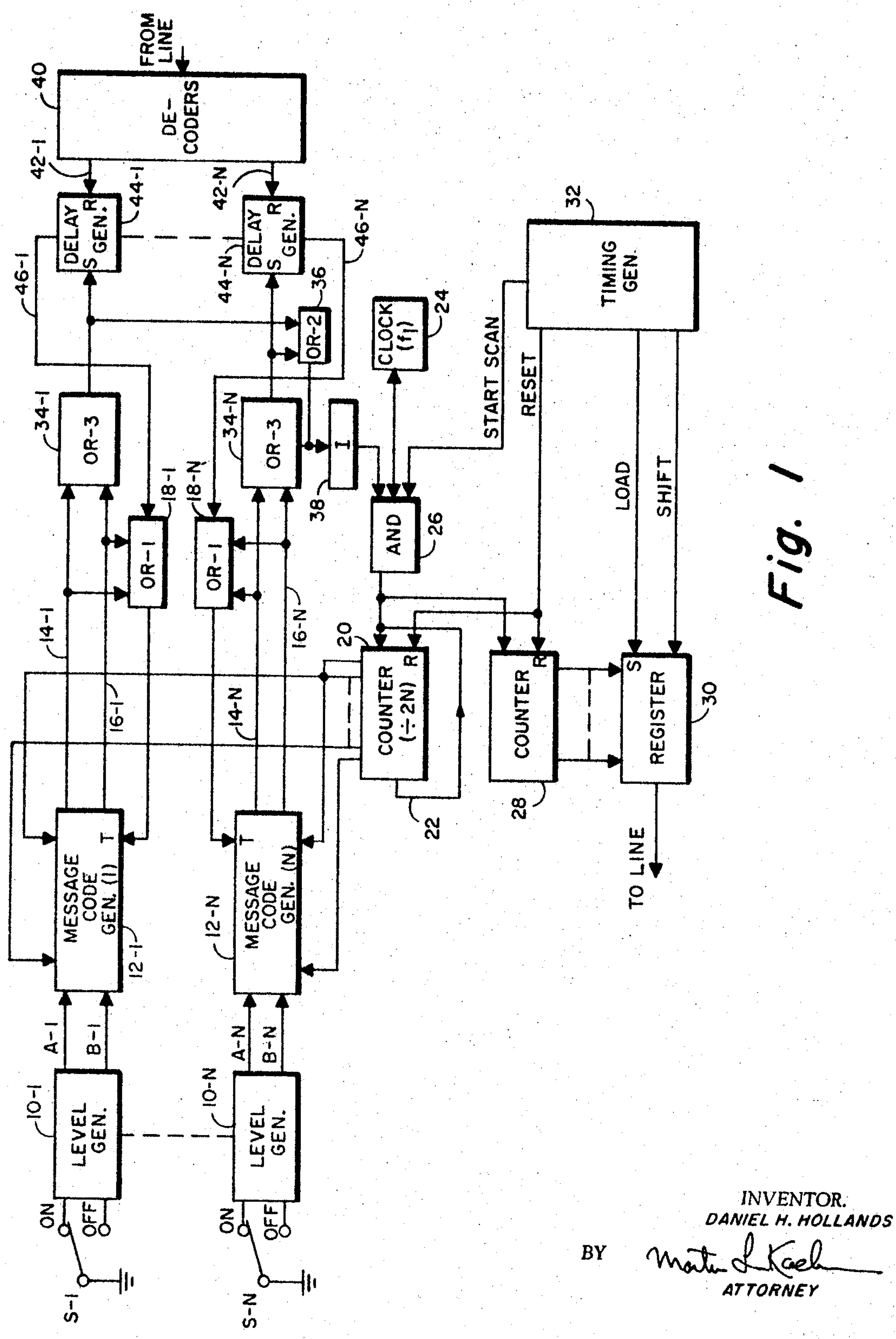
FIGURE 1 is a block diagram of a system for transmitting digital messages which embodies the present invention.

Referring more particularly to FIGURE 1, there is shown a plurality of binary elements which are represented as switches of the single pole, double throw type, S–1 through S–N. Each of these switches has on and off states. The switches may at any time be in different states, viz some switches may be on while others may be off. The pole of the switches are shown as being grounded. The on and off terminals are connected to level generators 10–1 through 10–N. These level generators, which will be described in detail in connection with FIGURE 2, translate the states of the switches into output voltage levels A–1 and B–1 through A–N and B–N. These levels may be a certain voltage or ground, depending upon the state of the switch which is connected to the level generator. Thus, if S–1 is on, the level generator 10–1 will generate a certain voltage level on output A–1 and ground on output B–1. Conversely, if S–1 is off, B–1 will be at the certain voltage level, whereas A–1 will be at ground.

These voltage levels are applied to message code generators 12–1 (corresponding to the switch S–1) through 12–N (corresponding to the switch S–N). The message code generators are so nomenclatured inasmuch as they provide a tag output in a certain time slot. The code which is generated is, in effect, a time sequential code. Each code generator has memory for the state of the switch which is connected thereto through a level generator. The code generators also have logic circuits for comparing the content of the memory with the present or existing state of the switch connected thereto so as to provide the output code when a change in the condition of the switch operatively connected thereto occurs. This output code may be a voltage level which occurs on lines 14–1 through 14–N when the change in switch state is from its off state to its on state. The output code effectively tags the change in switch state and is also referred to as a tag output. The tag output occurs on lines 16–1 through 16–N when the switches associated with the code generators change from their on state to their off state.

OR gates 18–1 through 18–N, indicated as OR–1 gates, feed back the tag outputs to the message code generators 12–1 through 12–N and trigger the memories thereof to store the new state of the switch associated therewith.

The message code generators 12–1 to 12–N are conditioned to operate in individual successive time slots by a counter 20, which cyclically generates a plurality of different digital codes. Such cyclical generation is obtained by a feedback connection 22 from the output of the counter 20 to the input thereof. The input pulses to the counter are derived from a clock pulse source 24 which may operate at a relatively high frequency compared to the rate at which the messages are to be transmitted by the system. For example, if a system is designed to transmit messages at a rate of about 1000 bits per second, the clock 24 may have an output pulse rate of 70 kc./s.

An AND gate 26 controls the application of the clock pulses to the counter 20. The counter 20 also includes decoding gates which are connected to the various stages thereof and provides the digital codes to the message generators 12–1 through 12–N. These digital codes may have 2N combinations corresponding to the different pairs of states of the N switches which provide the input information to the system. A pair of different codes is generated for each state of each switch. Accordingly, the counter is designed to divide the clock pulse rate by 2N so that it will have sufficient stages to provide the 2N codes in each cycle. Another counter 28, similar to the counter 20, is provided to count the output pulses from the clock source 24 which are transmitted through the AND gate 26. This counter also includes decoder gates which provide a digital output code containing a different combination of bits for each state of each of the switches. This code can be set into a register 30, which is connected to the decoder gate outputs of the counter 28. The register 30 may be read out sequentially into a data transmission line. It will be understood, however, that the output of the register may be fed to a suitable mode which translates the data into tones which are suitable for transmission over a telephone line or by means of a radio link. The line or link communicates with a receiving point which is equipped with a terminal for decoding the transmitted message. The decoded message may be used in set an array of switches corresponding to the switches S–1 to S–N or for other purposes, some of which are mentioned herein.

A timing generator 32 provides output pulses and levels which dictate the sequence of operation of the system. This timing generator may include multivibrators and frequency dividers which provides a plurality of output pulses of varying duration.

Figure 4:
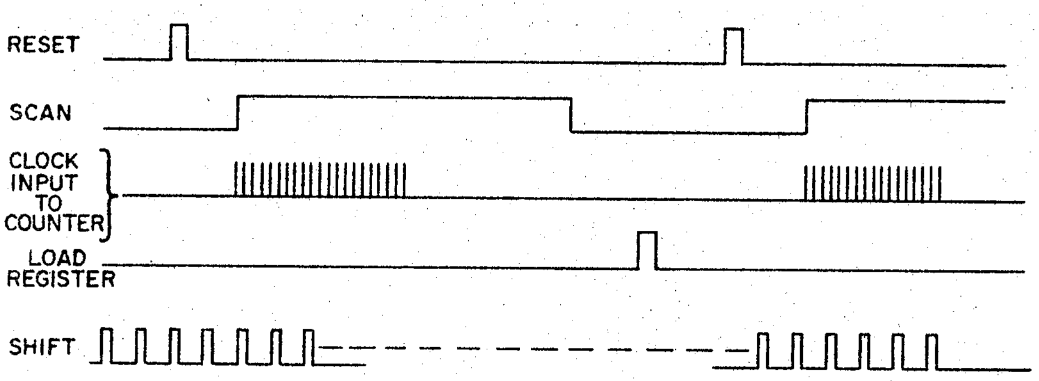
FIGURE 4 is a timing chart showing the sequence of operations performed by elements of the system of FIGURE 1 in the transmission of the digital messages.

The output lines 14–1, 16–1 through 14–N, 16–N from the code generators 12–1 to 12–N respectively are connected to other OR gates 34–1 through 34–N; the gate 34–1 being provided for the code generator 12–1 and the gate 34–N being provided for the code generator 12–N. These OR gates 34–1 through 34–N are labeled OR–3 in the drawing. The output of the OR gates 34–1 through 34–N are all connected as inputs to the OR gate 36 which is labeled OR–2. When a tag output occurs on any of the lines 14–1 through 14–N or 16–1 to 16–N, the OR gate 36 provides an output. This output is inverted in an inverter 38 and serves to inhibit the AND gate 26, thereby stopping the counters 22 and 28. A load pulse from the timing generator then sets the output of the counter 28 into the register 30. The register 30 receives shift pulses from the timing generator 32 which shifts the message stored in the register out to the line. After the counter 28 output code is loaded into the register 30, the counters 20 and 28 are both reset by a pulse on the reset output line from the timing generator 32. The timing generator then provides a start scan output level which will start the transmission of clock pulses from the clock 24 to the counters 20 and 28. The sequence of pulses from the timing generator and from the clock 24 to the counters is shown in the timing chart of FIGURE 4. Thus, a different digital code may be transmitted during each cycle of start scan, reset and load pulses from the timing generator 32.

The system also includes circuits for retransmitting the same message in the event that a verification message is not received from the receiving point. Verification messages from the transmitting point arrive over the line and are applied to a decoder 40. This decoder may include a register for translating the sequential bits making up each message into a parallel code. The decoders provide ouputs on different lines 42–1 through 42–N, respectively, for codes corresponding to different ones of the switches S–1 through S–N. The output lines 42–1 to 42–N transmit a pulse generated by the decoders 40, upon receipt of the code corresponding thereto, to the reset inputs of a plurality of delay generators 44–1 through 44–N, which correspond to different ones of the codes; viz the delay generator 44–1 corresponding to the switch S–1 and the delay generator 44–N corresponding to the switch S–N. The output of the OR–3 gate 34–1 is connected to the set input of the delay generator 42–1, and the OR gate 34–N is connected to the set input of the delay generator 42–N. Similarly, the other OR–3 gates are connected to the delay generators corresponding to the switches associated therewith. The delay generators are operative to generate an output pulse on output lines 46–1 through 46–N thereof a finite time, say one second, after the receipt of a pulse at their set inputs unless a pulse is received, prior to the end of this one second time period, at their reset inputs. A reset pulse is provided when a verification message for the transmitted message arrives from the line. Accordingly, if no vertification message arrives, say at the reset input of the generator 44–1, an output pulse is produced on the line 46–1. This output pulse is applied to the OR–1 gate 18–1 and is returned to the trigger input of the message code generator 12–1.

It will be recalled that a pulse is similarly applied to the trigger input in response to a tag output on either of the lines 14–1 or 16–1. Accordingly, the message coded generator will interpret the lack of a vertification signal in the same way as change in the state of the switch connected thereto. The message code generator therefore will be conditioned to provide a tag output in its time slot or when the code corresponding to that message code generator is produced by the counter 20. The tag output resulting from the lack of verification results in the retransmission of the unverified message.

Figure 2:
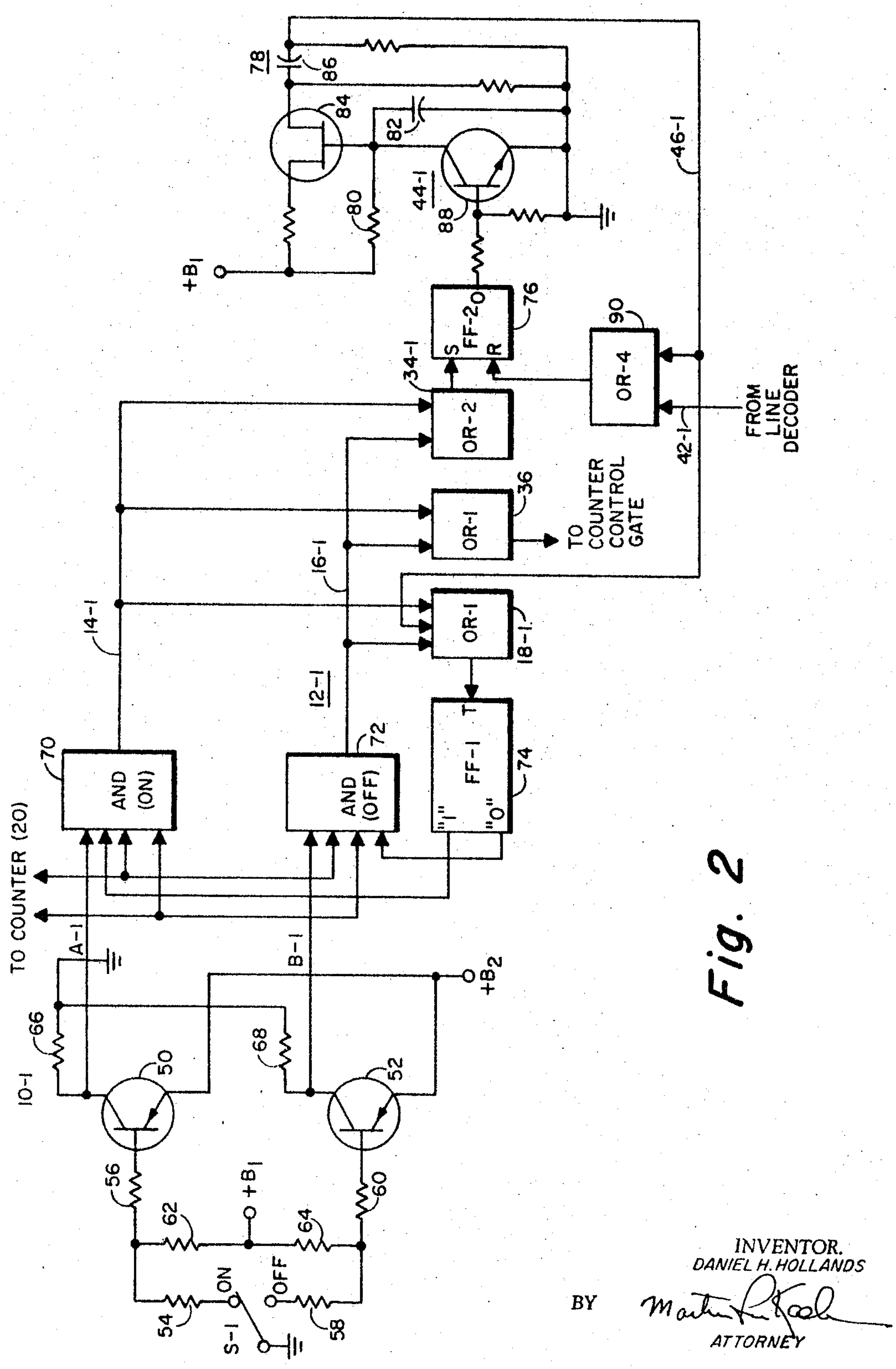
FIGURE 2 is a schematic and block diagram showing in greater detail a portion of the system shown in FIGURE 1.

The message code generator 12–1 and its associated OR gates 18–1, 34–1 and delay generator 44–1 are shown in FIGURE 2. It will be appreciated that the other message code generators, associated gates and delay generators may be similar. The switch S–1 is connected to the level generator 10–1, which includes a pair of transistors 50 and 52. These transistors are of the PNP type and are normally biased off (viz out of conduction) by the source at $+B_1$. The on terminal of the switch S–1 is connected to the base of the transistor 50 by way of resistors 54 and 56. The off terminal switch S–1 is connected to the base of the transistor 52 by way of resistors 58 and 60. Bias voltage for the transistors is applied to the bases from the source $+B_1$ through the resistors 56 and 60 and other resistors 62 and 64. Operating voltage from a source $+B_2$ is applied to the emitters of these transistors. The collectors of the transistors are connected to ground through load resistors 66 and 68 respectively. When the switch S–1 connects ground to its on terminal, as shown, the base of the transistor 50 is biased into conduction, thereby connecting the $+B_2$ source to the output line A–1. The level $+B_2$ represents the on state of the switch. The other transistor 52 is off and the output line B–1 is at ground potential. Conversely, if the pole of the switch S–1 is connected to the off terminal, line A–1 drops to ground potential, while B–1 assumes the level of the $+B_2$ source. It may be desirable to connect a negative voltage source to the pole of the switch S–1 in order to provide more positive switching action of the transistors 50 and 52.

The code generator 12–1 includes a pair of AND gates 70 and 72, respectively, corresponding to the on position of the switch S–1 and the off position thereof. The outputs of the counter 20 are connected in parallel to the inputs of the gates 70 and 72. The gate 70 is enabled when the counter 20 reaches a count corresponding to the on position of the switch S–1. The gate 72 is enabled when the counter reaches a count corresponding to the off position of the switch S–1. These counts may be multibit numbers which differ in value by the value of their lowest significant bit so that the gates 70 and 72 will be enabled one after the other. Other sequences of enablement will, of course, be possible.

The memory element of the message code generator 12–1 is provided by a flip-flop 74, which is labeled FF–1. This flip-flop is a triggerable flip-flop having "1" and "0" outputs, respectively, connected to the inputs of the gates 70 and 72. The flip-flop 74 is triggered by the output of the OR–1 gate 18–1 which passes the tag output which appears on the lines 14–1 or 16–1. The counter control OR–2 gate 36 is also connected to the lines 14–1 and 16–1 and provides an output which stops the counters when a tag output appears on either of the lines 14–1 or 16–1. Alternatively the OR–2 gate 36 may be connected to the output of the OR–3 gate 34–1 as shown in FIG. 1 and, as was explained above. The remaining OR gate 34–1 provides an output which sets a flip-flop 76 in the delay generator 44–1.

The delay generator itself includes a time delay circuit 78 which generates an output pulse on the line 46–1 after a fixed time delay, say, of one second. This time delay is provided by a charging circuit, including a resistor 80 and a capacitor 82. The capacitor 82 is charged through the resistor 82 from the source at $+B_1$. A uni-junction transistor 84 is connected between ground and the source at $+B_1$. When the capacitor 82 changes to the triggering level of the transistor 84, the transistor 84 fires and provides an output pulse which is coupled to the line 46–1 through a coupling capacitor 86. The charging capacitor 82 is shunted by the collector to emitter path of a transistor 88. This transistor 88 is of the NPN type and is rendered conductive by the "0" output of the flip-flop 76 (FF–2) when that flip-flop is reset.

When the flip-flop 76 is set by a pulse from the OR–3 gate 34–1, the transistor 88 is rendered non-conductive, and the capacitor 82 may charge. The line 42–1 from the decoder 40 is connected to the reset input of the flip-flop 76 by way of an OR gate 90 (labeled OR–4). If the flip-flop 76 is reset before the capacitor 82 is charged to a voltage sufficient to trigger the uni-junction transistor 84, the unijunction transistor will not be triggered until the start of the next charging cycle (viz when the flip-flop 76 is again set). The output line 46–1 also is connected to the reset input of the flip-flop 76 through the OR gate 90. The flip-flop 76 is therefore reset when the delay generator 44–1 provides an output pulse.

For the purpose of explaining the operation of the system, it will be assumed that the switch S–1 was switched from its off to its on position. Reference may be had to FIGURE 2. When the switch is in its off position, the flip-flop 74 will be set. Accordingly, the off state of the switch S–1 will be remembered by the flip-flop and manifested by a positive level at its "1" output and a ground level at its "0" output. With the switch in its on state, the line A–1 will be at a high level while the output B–1 will be at ground level. When the time slot of the code for the off position of the switch S–1 occurs, the gate 72 will be inhibited by the "0" output of the flip-flop 74. However, when the time slot of the code for the on position of the switch S–1 occurs, the AND gate 70 will be enabled by all of (1) the A–1 inputs, (2) the "1" output of the flip-flop 74 and (3) the inputs from the counter 20. Accordingly, a tag pulse will be produced on the line 14–1 and transmitted by both the OR–1 and OR–3 gates. The pulse from the OR–2 gate 36 stops the counters 20 and 28. The message stored in the counter 28 will then be loaded into the register 30 and shifted out to the line. The output of the OR–1 gate 18–1 is applied to the trigger input of the flip-flop 74 and triggers that flip-flop so that its "0" output goes high and its "1" output becomes low. The flip-flop 74 therefore stores the information that the message which was transmitted corresponding to the on position of the switch S–1.

Figure 3:
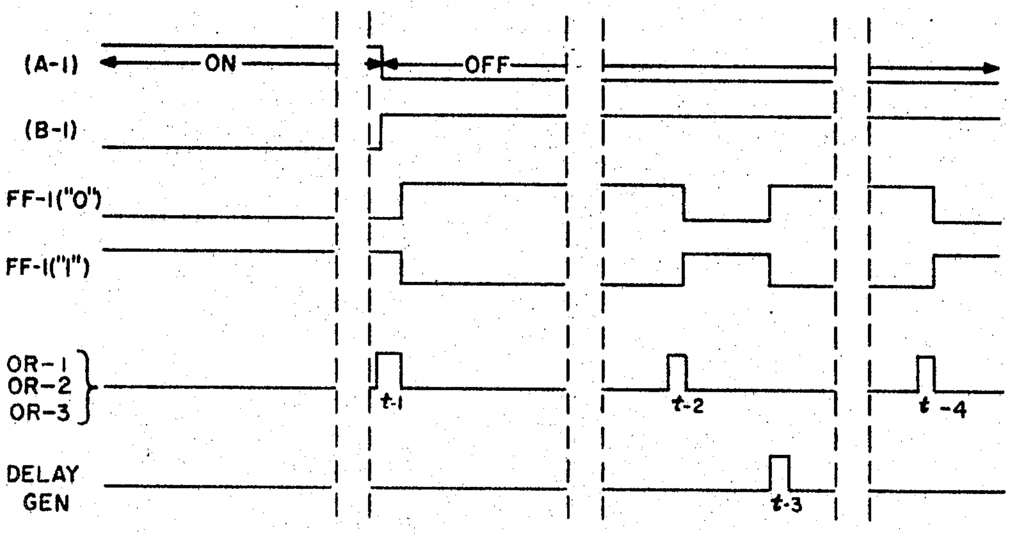
FIGURE 3 is a timing chart illustrating the timing of operations in the portion of the system shown in FIGURE 2.

If the switch S–1 is switched back to its off position, a tag pulse will similarly be produced on the line 16–1 in the time slot for the message corresponding to the off position of the switch S–1. FIGURE 3 illustrates output pulses which are produced at times indicated at *t*–1 and *t*–2. Time *t*–1 corresponds to the time slot for the on state of the switch S–1, and a pulse will be produced at that time if the switch was changed from its off state to its on state. A pulse is produced at time *t*–2 in the time slot for the off position of the switch S–1 when the switch is set back from its on state to its off state.

It will be assumed that a verification pulse did not arrive from the line decoder 40 after a message was transmitted at time *t*–2, corresponding to the off state of the switch S–1. Accordingly, at time *t*–3 a pulse is transmitted through the OR gate 18–1 and triggers the flip-flop 74. The state of the flip-flop reverses, and the flip-flop 74 stores information which indicates that the last message transmitted corresponded to the on state of the switch S–1, notwithstanding that the message transmitted corresponded to its off state. Accordingly, when the next time slot for the off state of the switch S–1 occurs (viz at time *t*–4) the AND gate 72 is enabled. A tag output is produced which effects the transmission of a message corresponding to the off position of the switch S–1 in the time slot *t*–4. Thus, if no verification message is ever received, the same message will be retransmitted in the same time slot.

From the foregoing description, it will be apparent that there has been provided an improved data transmission system which is capable of transmitting multibit digital messages very rapidly without requiring an excessive amount or complexity of equipment. While the invention has been described in connection with a system for transmitting binary information respecting switch positions, it will be appreciated that various modifications may be made therein. For example, the switches may be replaced by various stages of a register which contain a digital code which is to be transmitted. The switches themselves may be the contacts of relays so that the message may be programmed for transmission by means of push buttons. Other variations and modifications undoubtedly will suggest themselves to those skilled in the art. Accordingly, the foregoing description should be taken as illustrative and not in any limiting sense.

What is claimed is:

1. A system for transmitting messages representing the conditions of a plurality of binary elements, said system comprising (a) means for generating a plurality of different digital codes in a plurality of succesive time periods, different pairs of said codes corresponding to the states of different ones of said binary elements, and (b) a plurality of message code generators, each corresponding to a different one of said binary elements and each responsive to different ones of said pairs of codes for conditioning said first named means to transmit digital messages representing the ones of said binary elements which change their states and the state thereof.

2. A system for transmitting digital messages representing changes in state of each of a plurality of binary elements, said system comprising (a) a plurality of message code generators, each corresponding to a different one of said elements, and each having storage for information as to the condition of the one of said elements corresponding thereto, (b) means for cyclically interrogating each of said generators and for operating each said generators to produce an output when the state of the binary element upon its interrogation changes and disagrees with the information as to the condition which is stored therein, (c) means included in each said generator responsive to said output therefrom for changing the information stored therein to agree with the changed state of its corresponding binary element, and (d) means responsive to said output for transmitting said digital message representing the one of said binary elements which changes its state.

3. A system for generating a multibit digital message representing the condition of a plurality of binary elements, each having a pair of states, said system comprising (a) means for cyclically generating the messages corresponding to each state of each of said binary elements, (b) binary storage means corresponding to each of said binary elements, and (c) means responsive to the state of said elements and the information stored in said storage means transmitting those of said messages which correspond to the states of different ones of said binary elements only when the information stored in said storage means corresponding to said elements, as to the state thereof, disagrees with the actual state of said element.

4. A system for transmitting, to a receiving point, messages corresponding to the condition of a plurality of binary input elements, each of which has a pair of states, said system comprising (a) means for cyclically generating in a plurality of successive time slots a plurality of messages, each corresponding to a different state of different one of said binary input elements, (b) means for controlling the transmission of different pairs of said messages, each corresponding to a different one of said binary input elements, each of said message controlling means including (i) a binary storage element, (ii) logic means responsive to (1) the information stored in said storage element and (2) the state of said binary input element operative in the time slots for the states thereof for generating an output when the state of said binary element disagrees with the information stored in said storage element, and (iii) means operated by said output for changing the information stored in said storage element which disagrees with the state of said binary input element, and (c) means operated by said output for transmitting said message corresponding to the state of the one of said binary input elements which has a state which does not agree with the information in the binary storage element of the controlling means corresponding thereto.

5. The invention as set forth in claim 4, including means responsive to said output for changing the information stored in the storage element of the one of said controlling means which provides an output unless a vertification signal from said receiving point is obtained within a given period of time after said output is produced.

6. A system for transmitting, from a transmitting point to a receiving point, a digital message representing a change in state of a binary element having first and second states, said system comprising (a) a storage element at said transmitting point having first and second states corresponding to the state of said binary element, (b) means also at said transmitting point responsive to the states of said binary element and said storage element for generating at different times a first digital message when said binary element has its first state and said storage element has its second state and a second digital message when said binary element has its second state and said storage element has its second state, and (c) means operated by said last named means for setting said storage element to a state cooresponding to the state of said binary element.

7. The invention as set forth in claim 6, including means operated by said message generating means for operating said message generating means to regenerate the same message after a predetermined time delay, unless a message is received at said transmitting point from said receiving point.

8. The invention as set forth in claim 6, wherein said binary storage element is a flip-flop triggerable upon generation of each of said messages.

9. The invention as set forth in claim 6, wherein said generating means comprises (a) means for cyclically generating different digital codes corresponding respectively to said first message and to said second message, (b) a first gate enabled to provide first output (1) when said binary element is in its first state, (2) when said storage element is in its second state, and (3) when said code generated by said last named means corresponds to said first message, (c) a second gate enabled to provide a second output (1) when said binary element is in its second state, (2) when said storage element is in its first state, and (3) when said code generated by said last named means corresponds to said second message, and (d) means operated by said first and second outputs for respectively generating said first and second message, and wherein said storage element setting means includes means operated by said first and second outputs for setting said storage element to said state corresponding to the state of said binary element.

10. The invention as set forth in claim 9, wherein said means for cyclically generating different digital codes includes a source of clock pulses and a recycling counter for counting said pulses, said counter having a plurality of stages, the output of which present said different digital codes.

11. The invention as set forth in claim 10, including gate means responsive to either said first or said second output for inhibiting said counter.

12. The invention as set forth in claim 11, wherein said message generating means includes a second counter for counting said clock pulses and generating said messages.

13. The invention as set forth in claim 12, including a register for storing the messages generated by said second counter, and means for sequentially reading out said register to transmit said messages.

References Cited

UNITED STATES PATENTS

| | | | |
|---|---|---|---|
| 2,984,828 | 5/1961 | Gridley et al. | 340—204 |
| 3,099,816 | 7/1963 | Miller | 340—150 X |
| 3,145,374 | 8/1964 | Benner et al. | 340—203 X |
| 3,293,605 | 12/1966 | Moore | 340—150 |

MALCOLM A. MORRISON, Primary Examiner

C. E. ATKINSON, Assistant Examiner

U.S. Cl. X.R.

340—150, 203